(12) United States Patent  
Seo

(10) Patent No.: US 11,015,486 B2  
(45) Date of Patent: May 25, 2021

(54) GAS TURBINE

(71) Applicant: DOOSAN HEAVY INDUSTRIES & CONSTRUCTION CO., LTD., Changwon-si (KR)

(72) Inventor: Ja Won Seo, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 252 days.

(21) Appl. No.: 16/112,651

(22) Filed: Aug. 25, 2018

(65) Prior Publication Data

US 2019/0085728 A1 Mar. 21, 2019

(30) Foreign Application Priority Data

Sep. 15, 2017 (KR) .......................... 10-2017-0118375

(51) Int. Cl.
*F01D 25/26* (2006.01)
*F01D 25/16* (2006.01)
(Continued)

(52) U.S. Cl.
CPC ............ *F01D 25/26* (2013.01); *B23P 15/006* (2013.01); *F01D 9/044* (2013.01); *F01D 25/162* (2013.01);
(Continued)

(58) Field of Classification Search
CPC ........ F01D 25/26; F01D 9/044; F01D 25/164; F01D 25/16
See application file for complete search history.

(56) References Cited

U.S. PATENT DOCUMENTS 3,588,267 A * 6/1971 Wilkinson .............. F01D 9/044 415/135
4,302,062 A * 11/1981 Hunter, Jr. .............. F16C 23/08 384/493

(Continued)

FOREIGN PATENT DOCUMENTS

EP 2365191 A2 9/2011
EP 3260666 A1 12/2017
(Continued)

OTHER PUBLICATIONS

An European Search Report dated Dec. 17, 2018 in connection with European Patent Application No. 18187936.2.
(Continued)

*Primary Examiner* — Eldon T Brockman
(74) *Attorney, Agent, or Firm* — Invenstone Patent, LLC

(57) ABSTRACT

A gas turbine includes a housing; a rotor rotatable by a fluid flowing through the housing; a bearing for rotatably supporting the rotor; and a support structure configured to support the bearing with respect to the housing. The support structure includes an inner casing accommodating the bearing; an outer casing fastened to the housing; and a strut extending between the inner and outer casings, and at least one of the inner casing and the outer casing includes a diaphragm that is deformable in a radial direction of the rotor. Each casing includes a strut root connected to the strut, a strut platform surrounding the strut root and being formed as the diaphragm; and a main body surrounding the strut platform. Damage to the support structure due to thermal expansion can be prevented, and the support structure can be easily designed to avoid resonance between the support structure and the rotor.

20 Claims, 6 Drawing Sheets

(51) Int. Cl.
*F01D 9/04* (2006.01)
*B23P 15/00* (2006.01)
*F02C 7/06* (2006.01)
*F02C 3/04* (2006.01)

(52) U.S. Cl.
CPC .............. *F01D 25/164* (2013.01); *F02C 3/04* (2013.01); *F02C 7/06* (2013.01); *F05D 2220/32* (2013.01); *F05D 2240/128* (2013.01); *F05D 2240/50* (2013.01); *F05D 2250/294* (2013.01); *F05D 2260/941* (2013.01); *F05D 2260/96* (2013.01)

(56) References Cited

U.S. PATENT DOCUMENTS

| | | | | |
|---|---|---|---|---|
| 4,940,386 A | * | 7/1990 | Feuvrier | F01D 9/04 415/189 |
| 5,630,700 A | * | 5/1997 | Olsen | F01D 5/189 415/134 |
| 8,776,533 B2 | * | 7/2014 | Feindel | F01D 25/162 60/796 |
| 9,951,639 B2 | * | 4/2018 | Ivakitch | F01D 9/042 |
| 2017/0370283 A1 | * | 12/2017 | Dynak | F01D 25/162 |
| 2018/0010460 A1 | * | 1/2018 | Tsukimoto | B23K 15/0053 |

FOREIGN PATENT DOCUMENTS

| | | |
|---|---|---|
| JP | 10-238777 A | 9/1998 |
| JP | 4928857 B2 | 5/2012 |

OTHER PUBLICATIONS

Korean Office Action issued by the Korean Intellectual Property Office dated Jun. 26, 2018 in connection with Korean Patent Application No. 10-2017-0118375.

* cited by examiner

[FIG. 1]
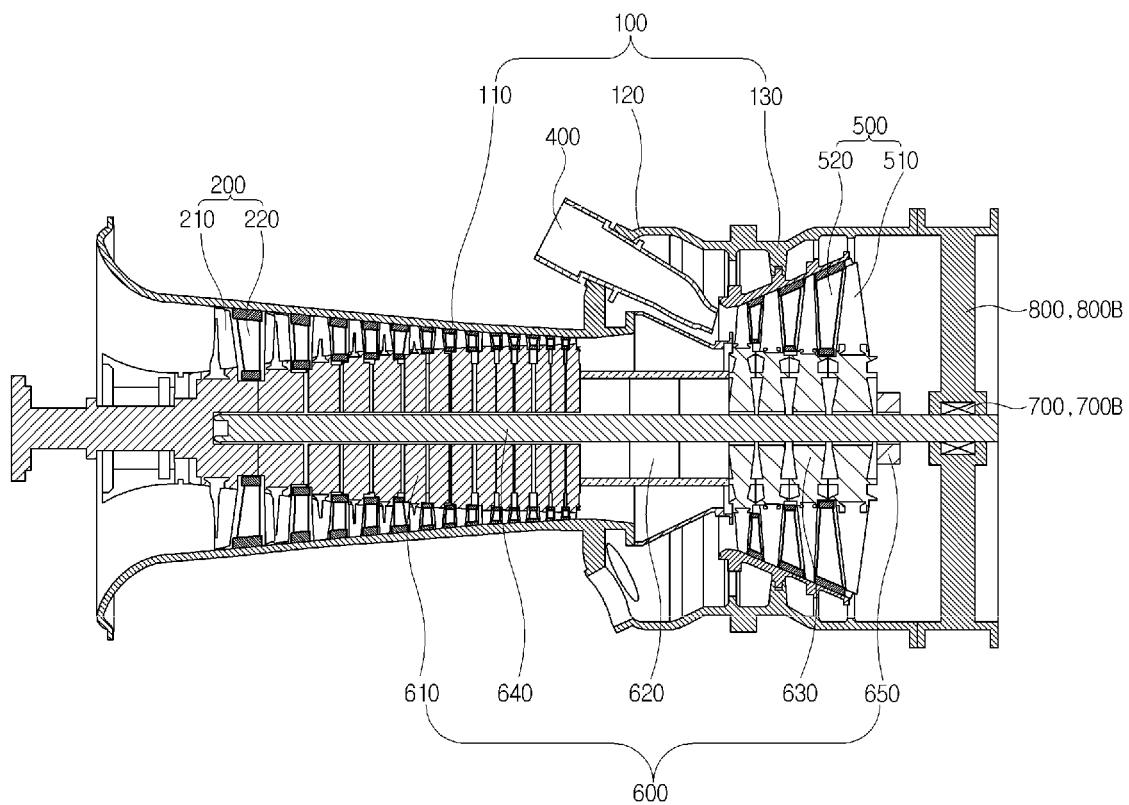

[FIG. 2]
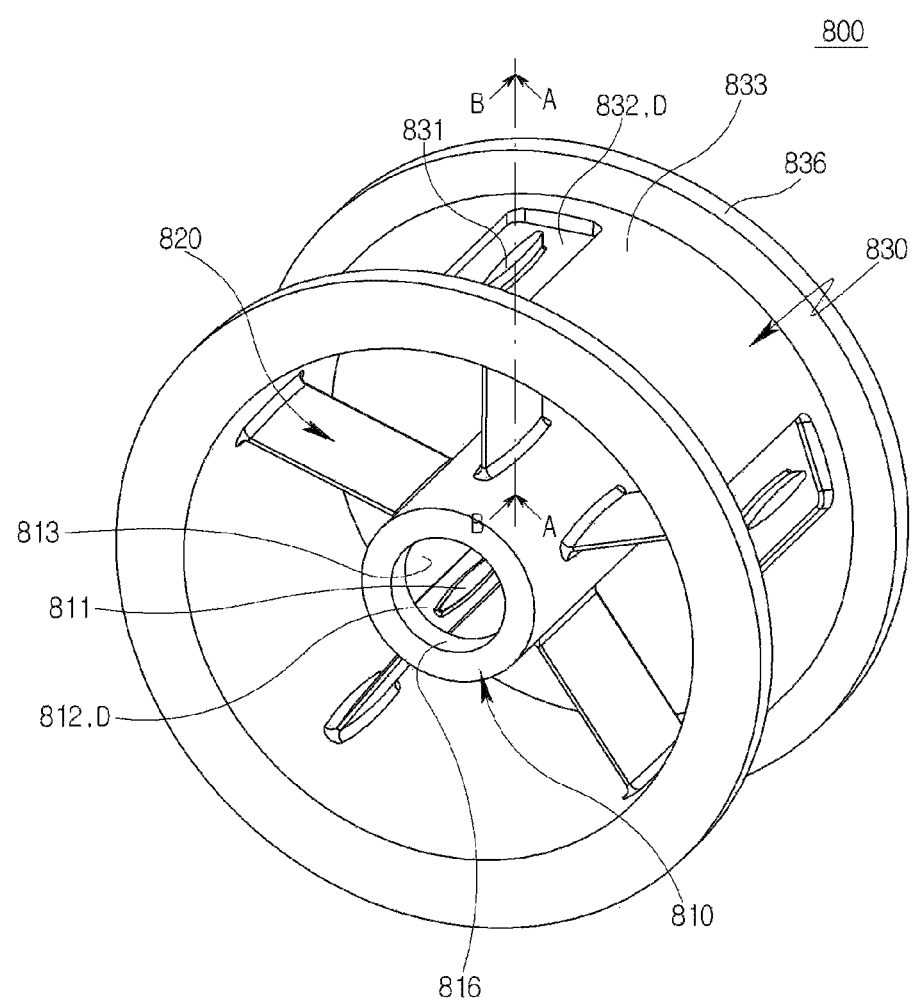

[FIG. 3]
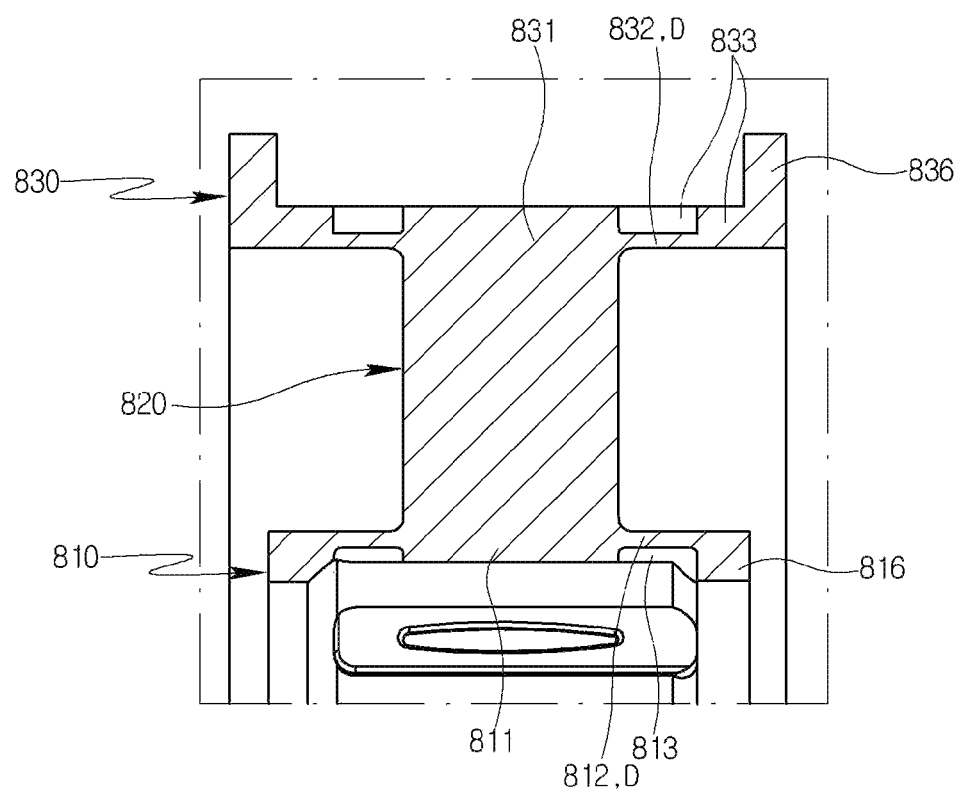

[FIG. 4]
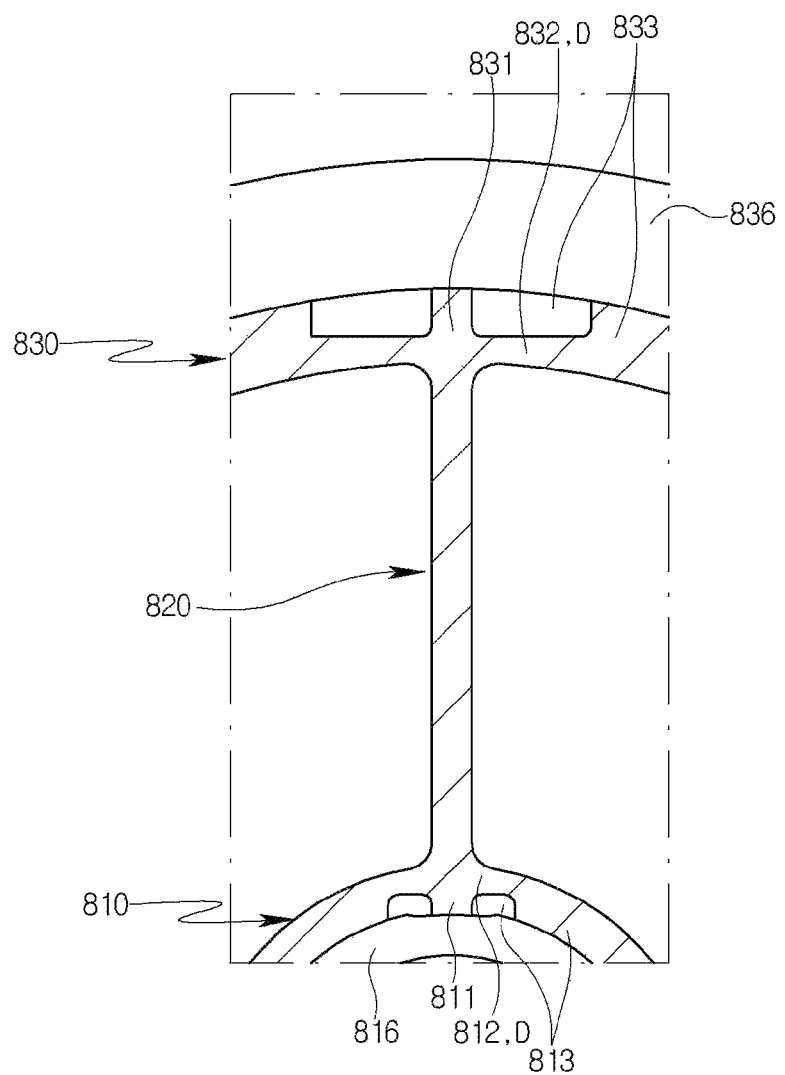

[FIG. 5]
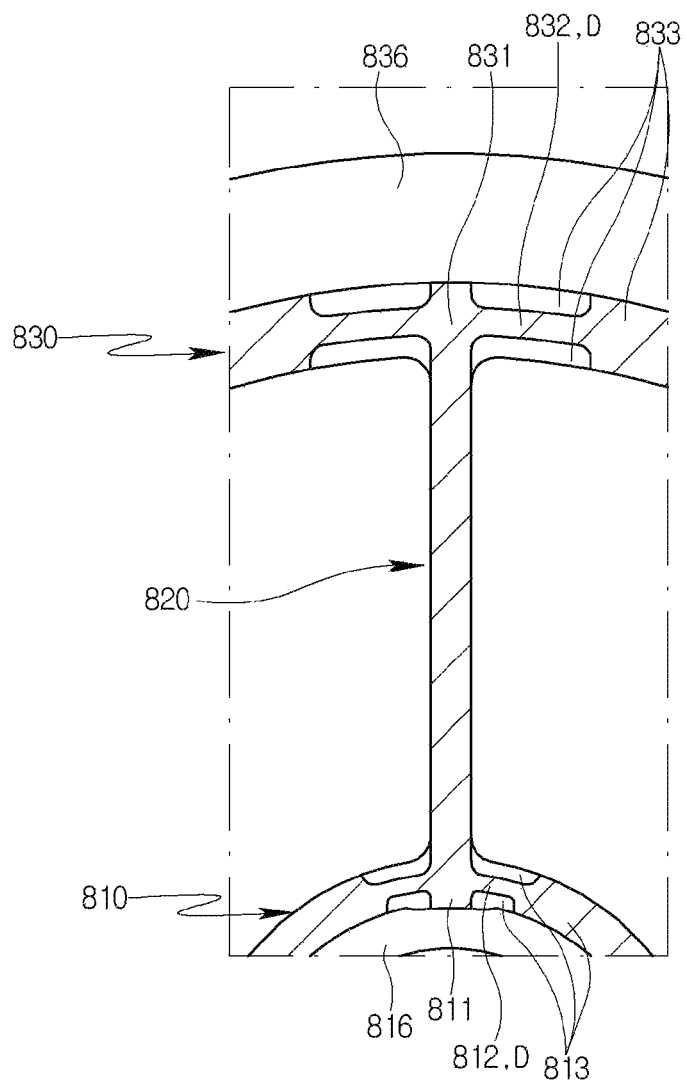

[FIG. 6]
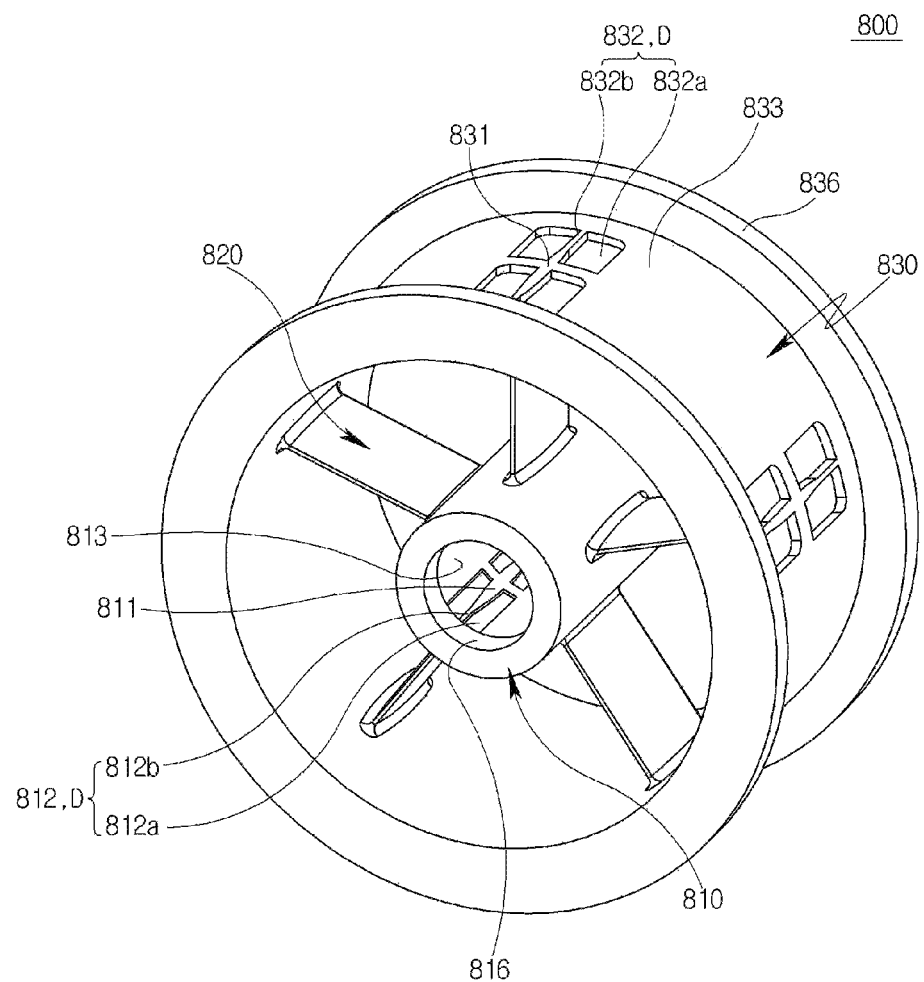

GAS TURBINE

CROSS-REFERENCE TO RELATED APPLICATIONS

This application claims priority to Korean Patent Application No(s). 10-2017-0118375, filed on Sep. 15, 2017, the disclosure of which is incorporated herein by reference in its entirety.

BACKGROUND OF THE INVENTION

Field of the Invention

Exemplary embodiments of the present disclosure relate to a gas turbine.

Description of the Related Art

In general, a turbine is a machine that converts the energy of a fluid such as water, gas, or steam into mechanical work, and is typically referred to as a turbomachine in which many buckets or blades are mounted to the circumference of a rotating body toward which steam or gas is emitted, to rotate the rotating body at high speed by impulse or reaction force.

Examples of the turbine include a water turbine using the energy of elevated water, a steam turbine using the energy of steam, an air turbine using the energy of high-pressure compressed air, a gas turbine using the energy of high-temperature and high-pressure gas, and the like. Among these, the gas turbine includes a compressor, a combustor, a turbine, and a rotor.

The compressor includes a plurality of compressor vanes and compressor blades arranged alternately.

The combustor supplies fuel to air compressed by the compressor for ignition with a burner to thereby produce high-temperature and high-pressure combustion gas.

The turbine includes a plurality of turbine vanes and turbine blades arranged alternately.

The rotor includes a plurality of compressor rotor disks fastened to the compressor blades, a plurality of turbine rotor disks fastened to the turbine blades, and a torque tube for transmitting torque from the turbine rotor disks to the compressor rotor disks by passing a driving force through the centers of the compressor, combustor, and the turbine. The rotor is rotatably supported at both ends by bearings, and one end is connected to a drive shaft of a generator.

In the gas turbine having the above structure, the rotor is rotated in such a manner that the air compressed by the compressor is mixed with fuel for combustion in the combustion chamber to produce hot combustion gas, the produced combustion gas is injected into the turbine, and the injected combustion gas generates torque while passing through the turbine blades.

This gas turbine is advantageous in that it can consume a very small amount of lubricant, have a significantly reduced amplitude which is a characteristic of reciprocating machines, and operate at a high speed because it does not have a reciprocating device such as a piston in a four-stroke engine to have no friction portion between the piston and the cylinder.

Meanwhile, each of the bearings rotatably supporting the rotor is supported by a support structure. The support structure includes an inner casing that accommodates the bearing, an outer casing that is fastened to a gas turbine housing, and a strut that extends from the inner casing to the outer casing, to fix the bearing to the housing.

However, this conventional gas turbine is problematic in that the support structure is damaged by operating, because it has components with different rates of thermal expansion. Specifically, the thermal expansion of the strut is large by a fluid (e.g., combustion gas) flowing through the strut. On the other hand, the thermal expansion of the outer casing is less than that of the strut since the outer casing is exposed to the surrounding atmosphere, and the thermal expansion of the inner casing is less than that of the strut since the inner casing is cooled to prevent deterioration of lubricants for lubricating the bearing. That is, the thermal expansion of the strut is suppressed by the inner casing and the outer casing. Thus, the support structure may be damaged since stress is concentrated on the strut, the connection between the strut and the inner casing, and the connection between the strut and the outer casing.

In addition, it is difficult to design the support structure to avoid resonance between the support structure and the rotor.

SUMMARY OF THE INVENTION

An object of the present disclosure is to provide a gas turbine capable of preventing a support structure from being damaged by thermal expansion.

Another object of the present disclosure is to provide a gas turbine that enables a support structure to be easily designed to avoid resonance between the support structure and a rotor.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a gas turbine may include a housing; a rotor rotatable by a fluid flowing through the housing; a bearing for rotatably supporting the rotor; and a support structure configured to support the bearing with respect to the housing. The support structure may include an inner casing accommodating the bearing; an outer casing fastened to the housing; and a strut extending between the inner and outer casings, and at least one of the inner casing and the outer casing may include a diaphragm that is deformable in a radial direction of the rotor.

The inner casing may include an inner casing strut root connected to the strut; an inner casing strut platform surrounding the inner casing strut root and being formed as the diaphragm; and an inner casing main body surrounding the inner casing strut platform. The inner casing strut platform may have a thickness smaller than a thickness of the inner casing main body. The thickness of the inner casing strut platform may impart the support structure with a different natural frequency from the rotor. The inner casing strut root may have a thickness greater than a thickness of the inner casing strut platform. An inner peripheral surface of the inner casing strut root and an inner peripheral surface of the inner casing main body may be spaced apart from a rotary shaft of the rotor by a first distance, an inner peripheral surface of the inner casing strut platform may be spaced apart from the rotary shaft of the rotor by a second distance greater than the first distance, and an outer peripheral surface of the inner casing strut root, an outer peripheral surface of the inner casing strut platform, and an outer peripheral surface of the inner casing main body may be spaced apart from the rotary shaft of the rotor by a fourth distance greater than the second distance. Alternatively, an inner peripheral surface of the inner casing strut root, an inner peripheral surface of the inner casing strut platform, and an inner peripheral surface of the inner casing main body may be spaced apart from a rotary shaft of the rotor by a first distance, an outer peripheral surface of the inner casing strut platform may be spaced apart from the rotary shaft of the rotor by a third distance greater than the first distance, and an outer peripheral surface of the inner casing strut root and an outer peripheral surface of the inner casing main body may be spaced apart from the rotary shaft of the rotor by a fourth distance greater than the third distance. Alternatively, an inner peripheral surface of the inner casing strut root and an inner peripheral surface of the inner casing main body may be spaced apart from a rotary shaft of the rotor by a first distance, an inner peripheral surface of the inner casing strut platform may be spaced apart from the rotary shaft of the rotor by a second distance greater than the first distance, an outer peripheral surface of the inner casing strut platform may be spaced apart from the rotary shaft of the rotor by a third distance greater than the second distance, and an outer peripheral surface of the inner casing strut root and an outer peripheral surface of the inner casing main body may be spaced apart from the rotary shaft of the rotor by a fourth distance greater than the third distance, in which case the inner peripheral surface of the inner casing strut platform may overlap the outer peripheral surface of the inner casing strut platform in a circumferential direction of the rotor.

The outer casing may include an outer casing strut root connected to the strut; an outer casing strut platform surrounding the outer casing strut root and being formed as the diaphragm; and an outer casing main body surrounding the outer casing strut platform. The outer casing strut platform may have a thickness smaller than a thickness of the outer casing main body. The thickness of the outer casing strut platform may be a thickness imparting the support structure with a different natural frequency from the rotor. The outer casing strut root may have a thickness greater than a thickness of the outer casing strut platform. An inner peripheral surface of the outer casing strut root, an inner peripheral surface of the outer casing strut platform, and an inner peripheral surface of the outer casing main body may be spaced apart from a rotary shaft of the rotor by a fifth distance, an outer peripheral surface of the outer casing strut platform may be spaced apart from the rotary shaft of the rotor by a seventh distance greater than the fifth distance, and an outer peripheral surface of the outer casing strut root and an outer peripheral surface of the outer casing main body may be spaced apart from the rotary shaft of the rotor by an eighth distance greater than the seventh distance. Alternatively, an inner peripheral surface of the outer casing strut root and an inner peripheral surface of the outer casing main body may be spaced apart from a rotary shaft of the rotor by a fifth distance, an inner peripheral surface of the outer casing strut platform may be spaced apart from the rotary shaft of the rotor by a sixth distance greater than the fifth distance; and an outer peripheral surface of the outer casing strut root, an outer peripheral surface of the outer casing strut platform, and an outer peripheral surface of the outer casing main body may be spaced apart from the rotary shaft of the rotor by an eighth distance greater than the sixth distance. Alternatively, an inner peripheral surface of the outer casing strut root and an inner peripheral surface of the outer casing main body may be spaced apart from a rotary shaft of the rotor by a fifth distance, an inner peripheral surface of the outer casing strut platform may be spaced apart from the rotary shaft of the rotor by a sixth distance greater than the fifth distance, an outer peripheral surface of the outer casing strut platform may be spaced apart from the rotary shaft of the rotor by a seventh distance greater than the sixth distance, and an outer peripheral surface of the outer casing strut root and an outer peripheral surface of the outer casing main body may be spaced apart from the rotary shaft of the rotor by an eighth distance greater than the seventh distance, in which case the inner peripheral surface of the outer casing strut platform may overlap the outer peripheral surface of the outer casing strut platform in a circumferential direction of the rotor.

The inner casing, the outer casing, and the strut may be integrally formed.

In accordance with another aspect of the present disclosure, a gas turbine may include a housing; a rotor rotatably provided in the housing and supported at opposite ends respectively by first and second bearings; a compressor configured to compress air introduced into the housing by torque transmitted from the rotor; a combustor configured to produce combustion gas by mixing fuel with the air compressed in the compressor for ignition; a turbine configured to rotate the rotor by torque obtained using the combustion gas produced in the combustor; a first support structure configured to support the first bearing with respect to the housing; and a second support structure configured to support the second bearing with respect to the housing. The second support structure may include an inner casing accommodating the second bearing, an outer casing fastened to the housing, and a strut extending between the inner casing and the outer casing. At least one of the inner casing and the outer casing may include a strut root connected to the strut, a strut platform surrounding the strut root, and a main body surrounding the strut platform, and the strut platform may have a thickness smaller than the strut root and the main body to enable expansion and contraction of the strut.

In accordance with another aspect of the present disclosure, a gas turbine may include a housing; a rotor rotated by a fluid flowing through the housing; a bearing rotatably supporting the rotor; and a support structure configured to support the bearing with respect to the housing. The support structure may include an inner casing accommodating the bearing, an outer casing fastened to the housing, and a strut extending between the inner casing and the outer casing, and at least one of the inner casing and the outer casing may include a strut root connected to the strut, a strut platform surrounding the strut root, and a main body surrounding the strut platform, the strut platform having a thickness imparting the support structure with a different natural frequency from the rotor.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view illustrating a gas turbine according to an embodiment of the present disclosure;

FIG. 2 is a perspective view illustrating a support structure in the gas turbine of FIG. 1;

FIG. 3 is a cross-sectional view taken along line A-A of FIG. 2;

FIG. 4 is a cross-sectional view taken along line B-B of FIG. 2;

FIG. 5 is a cross-sectional view of the support structure of FIG. 1, as along line B-B of FIG. 2, according to another embodiment of the present disclosure; and FIG. 6 is a perspective view of the support structure of FIG. 1 according to another embodiment of the present disclosure.

DESCRIPTION OF SPECIFIC EMBODIMENTS

Reference will now be made in detail to exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a gas turbine according to exemplary embodiments of the present disclosure will be described in detail with reference to the accompanying drawings.

FIGS. 1-4 illustrate a gas turbine according to an embodiment of the present disclosure.

Referring to FIG. 1, the gas turbine according to the embodiment of the present disclosure may include a housing 100, a rotor 600 that is rotatably provided in the housing 100, a compressor 200 that compresses air introduced into the housing 100 by torque transmitted from the rotor 600, a combustor 400 that produces combustion gas by mixing fuel with the air compressed in the compressor 200 for ignition, and a turbine 500 that rotates the rotor 600 by torque obtained from the combustion gas produced in the combustor 400. The gas turbine may further include a diffuser that serves to discharge the combustion gas passing through the turbine 500, and a generator (not shown) may be operatively connected to the rotor 600 for power generation.

The housing 100 may include a compressor housing 110 that accommodates the compressor 200, a combustor housing 120 that accommodates the combustor 400, and a turbine housing 130 that accommodates the turbine 500. The compressor housing 110, the combustor housing 120, and the turbine housing 130 may be sequentially arranged from upstream to downstream in the flow direction of the fluid.

The rotor 600 may include a compressor rotor disk 610 that is accommodated in the compressor housing 110, a turbine rotor disk 630 that is accommodated in the turbine housing 130, a torque tube 620 that is accommodated in the combustor housing 120 to connect the compressor rotor disk 610 and the turbine rotor disk 630, and a tie rod 640 and a fixing nut 650 that fasten the compressor rotor disk 610, the torque tube 620, and the turbine rotor disk 630 to one another.

The compressor rotor disk 610 may consist of a plurality of compressor rotor disks each of which is separately arranged along the axial direction of the rotor 600. That is, the compressor rotor disks 610 may be formed in a multi-stage manner. Each compressor rotor disk 610 may have a substantially disk shape, the outer periphery of which may include a plurality of compressor blade coupling slots each having, for example, a fir-tree shape for receiving a compressor blade 210 to be described later. The fir-tree shape prevents the decoupling of the compressor blade 210 from the compressor blade coupling slot in the radial direction of the rotor 600. Here, the compressor blade 210 is typically coupled to the compressor rotor disk 610 in a tangential-type or axial-type manner. In axial-type coupling, for example, the compressor blade coupling slots are arranged radially in the circumferential direction of the compressor rotor disk 610.

Similar to construction of the compressor rotor disk 610 as above, the turbine rotor disk 630 may consist of a plurality of turbine rotor disks each of which is separately arranged along the axial direction of the rotor 600. That is, the turbine rotor disks 630 may be formed in a multistage manner. Each turbine rotor disk 630 may have a substantially disk shape, the outer periphery of which may include a plurality of turbine blade coupling slots each having, for example, a fir-tree shape for receiving a turbine blade 510 to be described later. The fir-tree shape prevents the decoupling of the turbine blade 510 from the turbine blade coupling slot in the radial direction of the rotor 600. Here, the turbine blade 510 is typically coupled to the turbine rotor disk 630 in a tangential-type or axial-type manner. In axial-type coupling, for example, the turbine blade coupling slots are arranged radially in the circumferential direction of the turbine rotor disk 630.

The torque tube 620 is a torque transmission member that transmits the torque of the turbine rotor disk 630 to the compressor rotor disk 610. One end of the torque tube 620 may be fastened to the compressor rotor disk 610 of the compressor stage positioned farthest downstream, and the other end may be fastened to the turbine rotor disk 630 of the turbine stage positioned farthest upstream. Here, the torque tube 620 may have a protrusion formed at each end to engage with a groove provided in each of the compressor rotor disk 610 and the turbine rotor disk 630. Thus, it is possible to prevent the torque tube 620 from rotating relative to the compressor rotor disk 610 and the turbine rotor disk 630.

The torque tube 620 may have a hollow cylindrical shape such that the air supplied from the compressor 200 flows to the turbine 500 through the torque tube 620.

The torque tube 620 may be resistant to deformation and distortion due to the characteristics of the gas turbine that continues to operate for a long time, and may be easily assembled and disassembled for ease of maintenance.

The tie rod 640 may be formed to pass through the plurality of compressor rotor disks 610, the torque tube 620, and the plurality of turbine rotor disks 630. One end of the tie rod 640 may be fastened to the compressor rotor disk 610 of the compressor stage positioned farthest upstream, and the other end, extending in a direction opposite to the compressor 200, may protrude beyond the turbine rotor disk 630 of the turbine stage positioned farthest downstream, to be fastened to the fixing nut 650.

Here, the fixing nut 650 presses the farthest downstream turbine rotor disk 630 toward the compressor 200 to reduce the distance between the farthest upstream compressor rotor disk 610 and the farthest downstream turbine rotor disk 630. Thus, the plurality of compressor rotor disks 610, the torque tube 620, and the plurality of turbine rotor disks 630 may be compressed in the axial direction of the rotor 600. Therefore, it is possible to prevent the axial movement and relative rotation of the plurality of compressor rotor disks 610, the torque tube 620, and the plurality of turbine rotor disks 630.

Although one tie rod 640 is formed to pass through the centers of the plurality of compressor rotor disks 610, the torque tube 620, and the plurality of turbine rotor disks 630 in the present embodiment, the present disclosure is not limited thereto. That is, a separate tie rod 640 may be provided in each of the compressor 200 and the turbine 500, a plurality of tie rods 640 may be arranged circumferentially and radially, or a combination thereof may be used.

Through such a configuration, one end of the rotor 600 may be connected to the drive shaft of the generator, and the rotor 600 may be rotatably supported at both ends by bearings 700.

The compressor 200 may include a compressor blade 210 that rotates together with the rotor 600, and a compressor vane 220 that is fixedly installed in the housing 100 to align the flow of air introduced into the compressor blade 210.

The compressor blade 210 may consist of a plurality of compressor blades arranged in the axial direction of the rotor 600 for each of a plurality of stages, and the plurality of compressor blades 210 for each stage may be formed radially in the circumferential direction of the rotor 600.

Each of the compressor blades 210 may include a plate-shaped compressor blade platform, a compressor blade root member that extends inward from the compressor blade platform in the circumferential direction of the rotor 600, and a compressor blade airfoil that extends outward from the compressor blade platform in the circumferential direction of the rotor 600.

The compressor blade platform may be in contact with a compressor blade platform adjacent thereto, and serve to maintain the distance between the compressor blade airfoil and another compressor blade airfoil.

The compressor blade root member may be formed in a so-called axial-type manner in which the compressor blade root member is inserted into the above-mentioned compressor blade coupling slot in the axial direction of the rotor 600.

In this case, the compressor blade root member may have a fir-tree shape so as to correspond to the compressor blade coupling slot.

Although the compressor blade root member and the compressor blade coupling slot have a fir-tree shape in the present embodiment, the present disclosure is not limited thereto. For example, they may also have a dovetail shape or the like. In addition, the compressor blade 210 may be fastened to the compressor rotor disk 610 using a fastener other than the above form, for example using a fixture such as a key or a bolt.

In order to easily fasten the compressor blade root member to the compressor blade coupling slot, the compressor blade coupling slot may be greater than the compressor blade root member and a gap may be formed between the compressor blade root member and the compressor blade coupling slot in the state in which they are coupled to each other.

Although not separately illustrated in the drawings, the compressor blade root member may be fixed to the compressor blade coupling slot by a separate pin to prevent the decoupling of the compressor blade root member from the compressor blade coupling slot in the axial direction of the rotor 600.

The compressor blade airfoil may have an optimized airfoil shape according to the specifications of the gas turbine, and include a leading edge that is positioned upstream in the flow direction of air so that air flows to the leading edge, and a trailing edge that is positioned downstream in the flow direction of air so that air flows from the trailing edge.

The compressor vane 220 may consist of a plurality of compressor vanes formed in a plurality of stages in the axial direction of the rotor 600. Here, the compressor vane 220 and the compressor blade 210 may be arranged alternately in the flow direction of air.

The plurality of compressor vanes 220 may be formed radially in the circumferential direction of the rotor 600 for each stage.

Each of the compressor vanes 220 may include an annular compressor vane platform that is formed in the circumferential direction of the rotor 600, and a compressor vane airfoil that extends from the compressor vane platform in the circumferential direction of the rotor 600.

The compressor vane platform may include a root-side compressor vane platform that is formed at the airfoil root portion of the compressor vane airfoil to be fastened to the compressor housing 110, and a tip-side compressor vane platform that is formed at the airfoil tip portion of the compressor vane airfoil to face the rotor 600.

Although the compressor vane platform includes the root-side compressor vane platform and the tip-side compressor vane platform to more stably support the compressor vane airfoil by supporting the airfoil tip portion of the compressor vane airfoil as well as the airfoil root portion thereof in the present embodiment, the present disclosure is not limited thereto. That is, the compressor vane platform may also include the root-side compressor vane platform to support only the airfoil root portion of the compressor vane airfoil.

The compressor vane airfoil may have an optimized airfoil shape according to the specifications of the gas turbine, and include a leading edge that is positioned upstream in the flow direction of air so that air flows to the leading edge, and a trailing edge that is positioned downstream in the flow direction of air so that air flows from the trailing edge.

The combustor 400 may mix the air introduced from the compressor 200 with fuel for combustion to produce high-temperature and high-pressure combustion gas having high energy. The combustor 400 may increase the temperature of the combustion gas to a temperature at which the combustor 400 and turbine 500 are able to be resistant to heat in a constant-pressure combustion process.

In detail, the combustor 400 may consist of a plurality of combustors arranged in the combustor housing 120 in the circumferential direction of the rotor 600.

Each of the combustors 400 may include a liner into which the air compressed by the compressor 200 is introduced, a burner that injects fuel into the air introduced into the liner for combustion, and a transition piece that guides the combustion gas produced by the burner to the turbine 500.

The liner may include a flame container that defines a combustion chamber, and a flow sleeve that surrounds the flame container and defines an annular space.

The burner may include a fuel injection nozzle that is formed at the front end of the liner to inject fuel into the air introduced into the combustion chamber, and an ignition plug that is formed on the wall of the liner to ignite a mixture of air and fuel mixed in the combustion.

The transition piece may be configured such that the outer wall thereof is cooled by the air supplied from the compressor 200 to prevent damage to the transition piece by the high temperature of combustion gas.

That is, the transition piece may have a cooling hole formed for injection of air thereinto, and the main body in the transition piece may be cooled by the air introduced through the cooling hole.

Meanwhile, the air used to cool the transition piece may flow into the annular space of the liner, and may impinge on cooling air supplied through the cooling hole formed in the flow sleeve from the outside of the flow sleeve in the outer wall of the liner.

Although not separately illustrated in the drawings, a deswirler serving as a guide vane may be formed between the compressor 200 and the combustor 400 to adapt the angle of flow of air, introduced into the combustor 400, to a design angle of flow.

The turbine 500 may be formed similar to the compressor 200.

That is, the turbine 500 may include a turbine blade 510 that rotates together with the rotor 600, and a turbine vane 520 that is fixedly installed in the housing 100 to align the flow of air introduced into the turbine blade 510.

The turbine blade 510 may consist of a plurality of turbine blades arranged in a plurality of stages in the axial direction of the rotor 600, and the plurality of turbine blades 510 may be formed radially in the circumferential direction of the rotor 600 for each stage.

Each of the turbine blades 510 may include a plate-shaped turbine blade platform, a turbine blade root member that extends inward from the turbine blade platform in the circumferential direction of the rotor 600, and a turbine blade airfoil that extends outward from the turbine blade platform in the circumferential direction of the rotor 600.

The turbine blade platform may be in contact with a turbine blade platform adjacent thereto, and serve to maintain the distance between the turbine blade airfoil and another turbine blade airfoil.

The turbine blade root member may be formed in a so-called axial-type manner in which the turbine blade root member is inserted into the above-mentioned turbine blade coupling slot in the axial direction of the rotor 600.

The turbine blade root member may have a fir-tree shape so as to correspond to the turbine blade coupling slot.

Although the turbine blade root member and the turbine blade coupling slot have a fir-tree shape in the present embodiment, the present disclosure is not limited thereto. For example, they may also have a dovetail shape or the like. In addition, the turbine blade 510 may be fastened to the turbine rotor disk 630 using a fastener other than the above form, for example using a fixture such as a key or a bolt.

In order to easily fasten the turbine blade root member to the turbine blade coupling slot, the turbine blade coupling slot may be greater than the turbine blade root member and a gap may be formed between the turbine blade root member and the turbine blade coupling slot in the state in which they are coupled to each other.

Although not separately illustrated in the drawings, the turbine blade root member may be fixed to the turbine blade coupling slot by a separate pin to prevent the decoupling of the turbine blade root member from the turbine blade coupling slot in the axial direction of the rotor 600.

The turbine blade airfoil may have an optimized airfoil shape according to the specifications of the gas turbine, and include a leading edge that is positioned upstream in the flow direction of combustion gas so that combustion gas flows to the leading edge, and a trailing edge that is positioned downstream in the flow direction of combustion gas so that combustion gas flows from the trailing edge.

The turbine vane 520 may consist of a plurality of turbine vanes formed in a plurality of stages in the axial direction of the rotor 600. Here, the turbine vane 520 and the turbine blade 510 may be arranged alternately in the flow direction of air.

The plurality of turbine vanes 520 may be formed radially in the circumferential direction of the rotor 600 for each stage.

Each of the turbine vanes 520 may include an annular turbine vane platform that is formed in the circumferential direction of the rotor 600, and a turbine vane airfoil that extends from the turbine vane platform in the circumferential direction of the rotor 600.

The turbine vane platform may include a root-side turbine vane platform that is formed at the airfoil root portion of the turbine vane airfoil to be fastened to the turbine housing 130, and a tip-side turbine vane platform that is formed at the airfoil tip portion of the turbine vane airfoil to face the rotor 600.

Although the turbine vane platform includes the root-side turbine vane platform and the tip-side turbine vane platform to more stably support the turbine vane airfoil by supporting the airfoil tip portion of the turbine vane airfoil as well as the airfoil root portion thereof in the present embodiment, the present disclosure is not limited thereto. That is, the turbine vane platform may also include the root-side turbine vane platform to support only the airfoil root portion of the turbine vane airfoil.

The turbine vane airfoil may have an optimized airfoil shape according to the specifications of the gas turbine, and include a leading edge that is positioned upstream in the flow direction of combustion gas so that combustion gas flows to the leading edge, and a trailing edge that is positioned downstream in the flow direction of combustion gas so that combustion gas flows from the trailing edge.

Since the turbine 500 comes into contact with high-temperature and high-pressure combustion gas unlike the compressor 200, there is a need for a cooling means for preventing damage such as deterioration.

Thus, the gas turbine according to the present embodiment may further include a cooling passage through which some of the air compressed in the compressor 200 is bled from a partial position thereof to be supplied to the turbine 500.

The cooling passage may extend from the outside of the housing 100 (external passage), may extend through the inside of the rotor 600 (internal passage), or may use both of the external and internal passages.

The cooling passage may communicate with a turbine blade cooling passage formed in the turbine blade 510 such that the turbine blade 510 is cooled by cooling air.

The turbine blade cooling passage may communicate with a turbine blade film cooling hole formed in the surface of the turbine blade 510 so that cooling air is supplied to the surface of the turbine blade 510, thereby enabling the turbine blade 510 to be cooled by the cooling air in a so-called film cooling manner.

Besides, the turbine vane 520 may also be cooled by the cooling air supplied from the cooling passage, similar to the turbine blade 510.

Meanwhile, the turbine 500 requires a gap between the blade tip of the turbine blade 510 and the inner peripheral surface of the turbine housing 130 such that the turbine blade 510 is smoothly rotatable.

However, it is advantageous in terms of prevention of interference between the turbine blade 510 and the turbine housing 130 but it is disadvantageous in terms of leakage of combustion gas as the gap is large, and vice versa as the gap is small. That is, the flow of combustion gas injected from the combustor 400 may be sorted into a main flow in which combustion gas flows through the turbine blade 510, and a leakage flow in which combustion gas flows through the gap between the turbine blade 510 and the turbine housing 130. The leakage flow increases as the gap is large, which can prevent the interference between the turbine blade 510 and the turbine housing 130 due to thermal deformation or the like and thus damage though the efficiency of the gas turbine is reduced. On the other hand, the leakage flow decreases as the gap is small, which enhances the efficiency of the gas turbine but may lead to the interference between the turbine blade 510 and the turbine housing 130 due to thermal deformation or the like and thus damage.

Accordingly, the gas turbine according to the present embodiment may further include a sealing means for secure an appropriate gap to minimize a reduction in gas turbine efficiency while preventing the interference between the turbine blade 510 and the turbine housing 130 and thus damage.

The sealing means may include a shroud that is positioned at the blade tip of the turbine blade 510, a labyrinth seal that protrudes outward from the shroud in the circumferential direction of the rotor 600, and a honeycomb seal that is installed on the inner peripheral surface of the turbine housing 130.

The sealing means having such a configuration may form an appropriate gap between the labyrinth seal and the honeycomb seal to minimize a reduction in gas turbine efficiency due to leakage of combustion gas and to prevent the direct contact between the high-speed rotating shroud and the fixed honeycomb seal and thus damage.

Besides, the turbine 500 may further include a sealing means for blocking the leakage between the turbine vane 520 and the rotor 600. To this end, a brush seal and the like may be used in addition to the above labyrinth seal.

In the gas turbine having such a configuration, air introduced into the housing 100 may be compressed by the compressor 200, the air compressed by the compressor 200 may be mixed with fuel for combustion and then be converted into combustion gas in the combustor 400, the combustion gas produced by the combustor 400 may be introduced into the turbine 500, the combustion gas introduced into the turbine 500 may rotate the rotor 600 through the turbine blade 510 and then be discharged to the atmosphere through the diffuser, and the rotor 600 rotated by the combustion gas may drive the compressor 200 and the generator. That is, some of mechanical energy obtained from the turbine 500 may be supplied as energy required for compression of air in the compressor 200, and the remainder may be used to produce electric power by the generator.

Meanwhile, each of the bearings 700 rotatably supporting the rotor 600 is supported by a support structure 800 that may be formed so as not be damaged even though the support structure 800 includes components having different rates of thermal expansion.

In detail, referring to FIGS. 2 to 4, the support structure 800 may include an inner casing 810 that accommodates the bearing 700, an outer casing 830 that is fastened to the housing 100, and a strut 820 that extends between the inner casing 810 and the outer casing 830.

The inner casing 810 may include an inner casing annulus (811, 812, 813) that extends in the circumferential direction of the rotor 600 to surround the outer peripheral portion of the bearing 700, and an inner casing flange 816 that is disposed on opposite ends of inner casing annulus (811, 812, 813) and is bent inward, i.e., toward the rotor 600, to surround the ends of the bearing 700.

The inner casing annulus (811, 812, 813) may include an inner casing strut root 811 that is connected to the strut 820, an inner casing strut platform 812 that surrounds the inner casing strut root 811, and an inner casing main body 813 that surrounds the inner casing strut platform 812. Here, the inner casing strut root 811 is positioned on the same axis as the strut 820 in the radial direction of the rotor 600, the inner casing strut platform 812 surrounds the inner casing strut root 811 in the inner casing annulus (811, 812, 813), and the inner casing main body 813 surrounds the inner casing strut platform 812 in the inner casing annulus (811, 812, 813).

In order for the inner casing annulus (811, 812, 813) to absorb an expansion and contraction of the strut 820, the inner casing strut platform 812 may be formed as a diaphragm D that is deformable in the radial direction of the rotor 600. That is, the radial-direction thickness (hereinafter referred to as a "thickness") of the inner casing strut platform 812 may be smaller than that of the inner casing strut root 811 and that of the inner casing main body 813.

In detail, the inner peripheral surface of the inner casing strut root 811 and the inner peripheral surface of the inner casing main body 813 may be spaced apart from the rotary shaft of the rotor 600 by a first distance. The inner peripheral surface of the inner casing strut platform 812 may be spaced apart from the rotary shaft of the rotor 600 by a second distance greater than the first distance. The outer peripheral surface of the inner casing strut root 811, the outer peripheral surface of the inner casing strut platform 812, and the outer peripheral surface of the inner casing main body 813 may be spaced apart from the rotary shaft of the rotor 600 by a fourth distance greater than the second distance. In this case, each of the first distance, the second distance, and the fourth distance may be a range of distances. That is, for example, the second distance may include distance values that fall in a range and are greater than the maximum value of the first distance and less than the minimum value of the fourth distance.

Here, the small thickness of only the inner casing strut platform 812 reduces its rigidity and thus serves to prevent damage to the inner casing 810. That is, it may be preferable that the thickness of the inner casing strut root 811 is greater than that of the inner casing strut platform 812 in order to prevent an excessive reduction in the supporting force of the inner casing strut root 811 supporting the strut 820, and the thickness of the inner casing main body 813 is greater than that of the inner casing strut platform 812 in order to prevent an excessive reduction in the supporting force of the inner casing main body 813 supporting the bearing 700.

Meanwhile, the thickness of the inner casing strut root 811 may be greater than that of the inner casing main body 813, in which case the inner casing strut root 811 may collide with the bearing 700 when the strut 820 expands. Thus, it may be preferable that the thickness of the inner casing strut root 811 is greater than that of the inner casing strut platform 812 and smaller than or equal to that of the inner casing main body 813.

The outer casing 830 may be formed similar to the inner casing 810.

That is, the outer casing 830 may include an outer casing annulus (831, 832, 833) that extends in the circumferential direction of the rotor 600 at the outside of the strut 820 to surround the strut 820, and an outer casing flange 837 that is bent outward in the circumferential direction of the rotor 600 from both tip portions of the outer casing annulus (831, 832, 833) to be fastened to housing 100.

The outer casing annulus (831, 832, 833) may include an outer casing strut root 831 that is connected to the strut 820, an outer casing strut platform 832 that surrounds the outer casing strut root 831, and an outer casing main body 833 that surrounds the outer casing strut platform 832. Here, the outer casing strut root 831 is positioned on the same axis as the strut 820 in the radial direction of the rotor 600, the outer casing strut platform 832 surrounds the outer casing strut root 831 in the outer casing annulus (831, 832, 833), and the outer casing main body 833 surrounds the outer casing strut platform 832 in the outer casing annulus (831, 832, 833).

In order for the outer casing annulus (831, 832, 833) to absorb an expansion and contraction of the strut 820, the outer casing strut platform 832 may be formed as a diaphragm D that is deformable in the circumferential direction of the rotor 600.

That is, the thickness of the outer casing strut platform 832 may be smaller than that of the outer casing strut root 831 and that of the outer casing main body 833.

In detail, the inner peripheral surface of the outer casing strut root 831, the inner peripheral surface of the outer casing strut platform 832, and the inner peripheral surface of the outer casing main body 833 may be spaced apart from the rotary shaft of the rotor 600 by a fifth distance greater than the fourth distance. The outer peripheral surface of the outer casing strut platform 832 may be spaced apart from the rotary shaft of the rotor 600 by a seventh distance greater than the fifth distance. The outer peripheral surface of the outer casing strut root 831 and the outer peripheral surface of the outer casing main body 833 may be spaced apart from the rotary shaft of the rotor 600 by an eighth distance greater than the seventh distance. In this case, each of the fifth distance, the seventh distance, and the eighth distance may be a range of distances. That is, for example, the seventh distance may include distance values that fall in a range and are greater than the maximum value of the fifth distance and less than the minimum value of the eighth distance.

Here, the small thickness of only the outer casing strut platform 832 is to prevent damage to the outer casing 830 due to a reduction in its thickness and thus its rigidity. That is, it may be preferable that the thickness of the outer casing strut root 831 is greater than that of the outer casing strut platform 832 in order to prevent an excessive reduction in the supporting force of the outer casing strut root 831 supporting the strut 820, and the thickness of the outer casing main body 833 is greater than that of the outer casing strut platform 832 in order to prevent an excessive reduction in the fastening force that the outer casing main body 833 is fastened to the housing 100 through the outer casing flange 836.

Meanwhile, the thickness of the outer casing strut root 831 may be greater than that of the outer casing main body 833, in which case the outer casing strut root 831 may collide with other objects (for instance, the ground or floor) when the strut 820 expands. Thus, it may be preferable that the thickness of the outer casing strut root 831 is greater than that of the outer casing strut platform 832 and smaller than or equal to that of the outer casing main body 833.

The strut 820 may extend in the circumferential direction of the rotor 600.

The strut 820 may consist of a plurality of struts arranged radially in the circumferential direction of the rotor 600.

It is possible to prevent the support structure 800 having such a configuration from being damaged by thermal expansion.

In detail, the thermal expansion of the strut 820 may be large since the strut 820 is heated by combustion gas flowing therethrough.

On the other hand, the thermal expansion of the outer casing 830 may be less than that of the strut 820 since the outer casing 830 is exposed to the atmosphere.

The thermal expansion of the inner casing 810 may be less than that of the strut 820 since the inner casing 810 is cooled to prevent deterioration of lubricants for lubricating the bearing 700.

Here, since the inner casing strut platform 812 is formed as the diaphragm D, the thermal expansion of the strut 820 may not be suppressed. That is, the inner casing strut platform 812 is deformed (bowed) toward the rotor 600 when the strut 820 is thermally expanded, with the consequence that one end of the strut 820 may move inward in the radial direction of the rotor 600. On the other hand, the shape of the inner casing strut platform 812 is restored by moving back away from the rotor 600 when the strut 820 is thermally contracted, with the consequence that one end of the strut 820 may return to its original position by moving outward in the radial direction of the rotor 600.

In addition, since the outer casing strut platform 832 is also formed as the diaphragm D, the thermal expansion of the strut 820 may not be further suppressed. That is, the outer casing strut platform 832 is deformed (bowed) outwardly from the rotor 600 when the strut 820 is thermally expanded, with the consequence that the other end of the strut 820 may move outward in the radial direction of the rotor 600. On the other hand, the shape of the outer casing strut platform 832 is restored by moving back toward the rotor 600 when the strut 820 is thermally contracted, with the consequence that the other end of the strut 820 may be returned to its original position by moving inward in the circumferential direction of the rotor 600.

Thereby, since the suppression of the thermal expansion of the strut 820 is prevented by the inner casing 810 and the outer casing 830, it is possible to prevent stress concentration on and damage to the strut 820, the connection portion between the strut 820 and the inner casing 810, and the connection portion between the strut 820 and the outer casing 830.

Since the support structure 800 includes the diaphragm D, there is no need to include a separate elastic member, and the inner casing 810, the strut 820, and the outer casing 830 may be integrally formed. That is, the inner casing 810, the strut 820, and the outer casing 830 are not assembled after being individually manufactured. Thus, since a portion vulnerable to stress is removed, it is possible to improve durability and reduce a cost to manufacture.

In addition, the support structure 800 can be easily designed by the diaphragm D so as to avoid resonance between the support structure 800 and the rotor 600. That is, the support structure 800 must be designed to have a different natural frequency (stiffness) from the rotor 600 in order to avoid resonance with the rotor 600 when designing the support structure 800. In the present embodiment, since the support structure 800 includes the diaphragm D, the thickness of which can be adjusted, the natural frequency of the support structure 800 can be easily adjusted. That is, when the inner casing strut platform 812 is formed to have a thickness, in which the natural frequency of the support structure 800 differs from that of the rotor 600, in the range in which the thickness of the inner casing strut platform 812 is smaller than that of the inner casing strut root 811 and that of the inner casing main body 813, it is possible to prevent resonance between the support structure 800 and the rotor 600 with ease. Alternatively, when the outer casing strut platform 832 is formed to have a thickness, in which the natural frequency of the support structure 800 differs from that of the rotor 600, in the range in which the thickness of the outer casing strut platform 832 is smaller than that of the outer casing strut root 831 and that of the outer casing main body 833, it is possible to prevent resonance between the support structure 800 and the rotor 600 with ease.

In the present embodiment, the inner peripheral surface of the inner casing strut platform 812 is recessed and the outer peripheral surface of the outer casing strut platform 832 is recessed. Thus, the diaphragm D is formed in each of the inner casing 810 and the outer casing 830, but the present disclosure is not limited thereto.

For example, in addition to the inner peripheral surface of the inner casing strut platform 812 and the outer peripheral surface of the outer casing strut platform 832, the outer peripheral surface of the inner casing strut platform 812 and the inner peripheral surface of the outer casing strut platform 832 may also be recessed as illustrated in FIG. 5. That is, the inner peripheral surface of the inner casing strut root 811 and the inner peripheral surface of the inner casing main body 813 may be spaced apart from the rotary shaft of the rotor 600 by a first distance. The inner peripheral surface of the inner casing strut platform 812 may be spaced apart from the rotary shaft of the rotor 600 by a second distance greater than the first distance. The outer peripheral surface of the inner casing strut platform 812 may be spaced apart from the rotary shaft of the rotor 600 by a third distance greater than the second distance. The outer peripheral surface of the inner casing strut root 811 and the outer peripheral surface of the inner casing main body 813 may be spaced apart from the rotary shaft of the rotor 600 by a fourth distance greater than the third distance. The inner peripheral surface of the outer casing strut root 831 and the inner peripheral surface of the outer casing main body 833 may be spaced apart from the rotary shaft of the rotor 600 by a fifth distance greater than the fourth distance. The inner peripheral surface of the outer casing strut platform 832 may be spaced apart from the rotary shaft of the rotor 600 by a sixth distance greater than the fifth distance. The outer peripheral surface of the outer casing strut platform 832 may be spaced apart from the rotary shaft of the rotor 600 by a seventh distance greater than the sixth distance. The outer peripheral surface of the outer casing strut root 831 and the outer peripheral surface of the outer casing main body 833 may be spaced apart from the rotary shaft of the rotor 600 by an eighth distance greater than the seventh distance. In this case, the inner peripheral surface of the inner casing strut platform 812 may overlap (coincide at least in part with) the outer peripheral surface of the inner casing strut platform 812 in the circumferential direction of the rotor 600, and the inner peripheral surface of the outer casing strut platform 832 may overlap (coincide at least in part with) the outer peripheral surface of the outer casing strut platform 832 in the circumferential direction of the rotor 600. In this case, the action and effect may be identical to those in the above-described embodiment. However, in this case, the strut 820 may be expanded and contracted with more ease.

By way of another example, although not illustrated in the drawings, the outer peripheral surface of the inner casing strut platform 812 may be recessed instead of the inner peripheral surfaced of the inner casing strut platform 812, and the inner peripheral surface of the outer casing strut platform 832 may be recessed instead of the outer peripheral surface of the outer casing strut platform 832. That is, the inner peripheral surface of the inner casing strut root 811, the inner peripheral surface of the inner casing strut platform 812, and the inner peripheral surface of the inner casing main body 813 may be spaced apart from the rotary shaft of the rotor 600 by a first distance. The outer peripheral surface of the inner casing strut platform 812 may be spaced apart from the rotary shaft of the rotor 600 by a third distance greater than the first distance. The outer peripheral surface of the inner casing strut root 811 and the outer peripheral surface of the inner casing main body 813 may be spaced apart from the rotary shaft of the rotor 600 by a fourth distance greater than the third distance. The inner peripheral surface of the outer casing strut root 831 and the inner peripheral surface of the outer casing main body 833 may be spaced apart from the rotary shaft of the rotor 600 by a fifth distance greater than the fourth distance. The inner peripheral surface of the outer casing strut platform 832 may be spaced apart from the rotary shaft of the rotor 600 by a sixth distance greater than the fifth distance. The outer peripheral surface of the outer casing strut root 831, the outer peripheral surface of the outer casing strut platform 832, and the outer peripheral surface of the outer casing main body 833 may be spaced apart from the rotary shaft of the rotor 600 by an eighth distance greater than the sixth distance. In this case, the action and effect may be identical to those in the above-described embodiment.

In addition, although not illustrated in the drawings, the diaphragm D may also be formed only in one of the inner casing 810 and the outer casing 830. In this case, the action and effect may be identical to those in the above-described embodiment. However, in this case, the supporting force of the support structure 800 may be improved.

In the present embodiment, the thickness of the inner casing strut platform 812 and the thickness of the outer casing strut platform 832 vary depending on the direction of rotation of the rotor 600. That is, as illustrated in FIG. 4, the outer peripheral surface of the inner casing strut platform 812 extends in the circumferential direction of the rotor 600, whereas the inner peripheral surface of the inner casing strut platform 812 extends in a direction perpendicular to the direction of rotation of the rotor 600. Thus, the thickness of the inner casing strut platform 812 is reduced as the inner casing strut platform 812 is close to the strut 820. The inner peripheral surface of the outer casing strut platform 832 extends in the circumferential direction of the rotor 600, whereas the outer peripheral surface of the outer casing strut platform 832 extends in a direction perpendicular to the direction of rotation of the rotor 600. Thus, the thickness of the outer casing strut platform 832 is reduced as the outer casing strut platform 832 is close to the strut 820. However, the present disclosure is not limited thereto, and the thickness of the inner casing strut platform 812 and the thickness of the outer casing strut platform 832 may be uniformly formed in the circumferential direction of the rotor 600. That is, for example, all of the outer peripheral surface of the inner casing strut platform 812, the inner peripheral surface of the inner casing strut platform 812, the inner peripheral surface of the outer casing strut platform 832, and the outer peripheral surface of the outer casing strut platform 832 may extend in the circumferential direction of the rotor 600 as illustrated in FIG. 5. In this case, it can be advantageous in terms of durability since stress is evenly distributed in the diaphragm D.

In the present embodiment, the thickness of the inner casing strut platform 812 is generally smaller than that of the inner casing strut root 811 and that of the inner casing main body 813. The thickness of the outer casing strut platform 832 is generally smaller than that of the outer casing strut root 831 and that of the outer casing main body 833. In this case, it is advantageous to easily expand and contract the strut 820, but it may be disadvantageous in terms of support rigidity. Considering this point, as illustrated in FIG. 6, the inner casing strut platform 812 may include an inner casing strut platform wall 812a that has a thickness smaller than the inner casing strut root 811 and the inner casing main body 813, and an inner casing strut platform rib 812b that is thicker than the inner casing strut platform wall 812a and connects the inner casing strut root 811 to the inner casing main body 813 across the inner casing strut platform 812. The inner casing strut platform rib 812b may consist of a plurality of inner casing strut platform ribs arranged radially about the inner casing strut root 811. Similarly, the outer casing strut platform 832 may include an outer casing strut platform wall 832a that has a thickness smaller than the outer casing strut root 831 and the outer casing main body 833, and an outer casing strut platform rib 832b that is thicker than the outer casing strut platform wall 832a and connects the outer casing strut root 831 to the outer casing main body 833 across the outer casing strut platform 832. The outer casing strut platform rib 832b may consist of a plurality of outer casing strut platform ribs arranged radially about the outer casing strut root 831.

In the present embodiment, the diaphragm D is formed in the support structure 800 positioned at the downstream end of the gas turbine, which is in the direction of the turbine 500 rather than the compressor 200. That is, the bearing 700 includes a first bearing (not shown) that supports one end of the rotor 600 at the compressor 200 end and a second bearing 700B that supports the other end of the rotor 600 at the turbine 500 end, and the support structure 800 includes a first support structure (not shown) that supports the first bearing (not shown) and a second support structure 800B that supports the second bearing 700B. The diaphragm D is formed in the second support structure 800B, which is disposed in a higher temperature environment, from among the first support structure (not shown) and the second support structure 800B in the present embodiment, but the present disclosure is not limited thereto. For example, the diaphragm D may be formed in the first support structure (not shown) only or in both of the first support structure (not shown) and the second support structure 800B.

While the present disclosure has been described with respect to the specific embodiments, it will be apparent to those skilled in the art that various changes and modifications may be made without departing from the spirit and scope of the disclosure as defined in the following claims.

What is claimed is:

1. A gas turbine comprising:
    a housing;
    a rotor rotatable by a fluid flowing through the housing;
    a bearing for rotatably supporting the rotor; and
    a support structure configured to support the bearing with respect to the housing, the support structure comprising:
        an inner casing accommodating the bearing;
        an outer casing fastened to the housing; and
        a strut extending between the inner and outer casings,
        wherein at least one of the inner casing and the outer casing comprises:
            a main body;
            a strut platform surrounded by the main body, the strut platform including a peripheral surface that is substantially flat to form a diaphragm that is deformable in a radial direction of the rotor, the peripheral surface facing radially away from the strut and extending from the main body to the strut root in a circumferential direction of the rotor; and
            a strut root surrounded by the strut platform, the strut root extending from the strut along a longitudinal axis of the strut and protruding from the peripheral surface of the strut platform.

2. The gas turbine according to claim 1,
    wherein the main body, the strut platform, and the strut root of the at least one of the inner casing and the outer casing are an inner casing main body, an inner casing strut platform including an inner peripheral surface, and an inner casing strut root, respectively, and
    wherein the inner peripheral surface of the inner casing strut platform is substantially flat and extends from the inner casing main body to the inner casing strut root in a circumferential direction of the rotor.

3. The gas turbine according to claim 2, wherein the inner casing strut platform of the inner casing has a thickness smaller than a thickness of the inner casing main body.

4. The gas turbine according to claim 3, wherein the thickness of the inner casing strut platform imparts the support structure with a different natural frequency from the rotor.

5. The gas turbine according to claim 1, wherein the strut root has a thickness in an axial direction of the rotor that is substantially equal to a thickness of the strut in the axial direction of the rotor.

6. The gas turbine according to claim 5, wherein:
    an inner peripheral surface of the inner casing strut root and an inner peripheral surface of the inner casing main body are spaced apart from a rotary shaft of the rotor by a first distance;
    the inner peripheral surface of the inner casing strut platform is spaced apart from the rotary shaft of the rotor by a second distance greater than the first distance; and
    an outer peripheral surface of the inner casing strut root, an outer peripheral surface of the inner casing strut platform, and an outer peripheral surface of the inner casing main body are spaced apart from the rotary shaft of the rotor by a fourth distance greater than the second distance.

7. The gas turbine according to claim 5, wherein:
    an inner peripheral surface of the inner casing strut root, the inner peripheral surface of the inner casing strut platform, and an inner peripheral surface of the inner casing main body are spaced apart from a rotary shaft of the rotor by a first distance;
    an outer peripheral surface of the inner casing strut platform is spaced apart from the rotary shaft of the rotor by a third distance greater than the first distance; and
    an outer peripheral surface of the inner casing strut root and an outer peripheral surface of the inner casing main body are spaced apart from the rotary shaft of the rotor by a fourth distance greater than the third distance.

8. The gas turbine according to claim 5, wherein:
    an inner peripheral surface of the inner casing strut root and an inner peripheral surface of the inner casing main body are spaced apart from a rotary shaft of the rotor by a first distance;
    the inner peripheral surface of the inner casing strut platform is spaced apart from the rotary shaft of the rotor by a second distance greater than the first distance;
    an outer peripheral surface of the inner casing strut platform is spaced apart from the rotary shaft of the rotor by a third distance greater than the second distance; and
    an outer peripheral surface of the inner casing strut root and an outer peripheral surface of the inner casing main body are spaced apart from the rotary shaft of the rotor by a fourth distance greater than the third distance.

9. The gas turbine according to claim 8, wherein the inner peripheral surface of the inner casing strut platform overlaps the outer peripheral surface of the inner casing strut platform in the circumferential direction of the rotor.

10. The gas turbine according to claim 1,
wherein the main body, the strut platform, and the strut root of the at least one of the inner casing and the outer casing are an outer casing main body, an outer casing strut platform including an outer peripheral surface, and an outer casing strut root, respectively, and
wherein the outer peripheral surface of the outer casing strut platform is substantially flat and extends from the outer casing main body to the outer casing strut root in a circumferential direction of the rotor.

11. The gas turbine according to claim 10, wherein the outer casing strut platform has a thickness smaller than a thickness of the outer casing main body.

12. The gas turbine according to claim 11, wherein the thickness of the outer casing strut platform is a thickness imparting the support structure with a different natural frequency from the rotor.

13. The gas turbine according to claim 1, wherein the strut root has a length in the circumferential direction of the rotor that is substantially equal to a length of the strut in the circumferential direction of the rotor.

14. The gas turbine according to claim 13, wherein:
an inner peripheral surface of the outer casing strut root, an inner peripheral surface of the outer casing strut platform, and an inner peripheral surface of the outer casing main body are spaced apart from a rotary shaft of the rotor by a fifth distance;
the outer peripheral surface of the outer casing strut platform is spaced apart from the rotary shaft of the rotor by a seventh distance greater than the fifth distance; and
an outer peripheral surface of the outer casing strut root and an outer peripheral surface of the outer casing main body are spaced apart from the rotary shaft of the rotor by an eighth distance greater than the seventh distance.

15. The gas turbine according to claim 13, wherein:
an inner peripheral surface of the outer casing strut root and an inner peripheral surface of the outer casing main body are spaced apart from a rotary shaft of the rotor by a fifth distance;
an inner peripheral surface of the outer casing strut platform is spaced apart from the rotary shaft of the rotor by a sixth distance greater than the fifth distance; and
an outer peripheral surface of the outer casing strut root, the inner peripheral surface of the outer casing strut platform, and an outer peripheral surface of the outer casing main body are spaced apart from the rotary shaft of the rotor by an eighth distance greater than the sixth distance.

16. The gas turbine according to claim 13, wherein:
an inner peripheral surface of the outer casing strut root and an inner peripheral surface of the outer casing main body are spaced apart from a rotary shaft of the rotor by a fifth distance;
an inner peripheral surface of the outer casing strut platform is spaced apart from the rotary shaft of the rotor by a sixth distance greater than the fifth distance;
the inner peripheral surface of the outer casing strut platform is spaced apart from the rotary shaft of the rotor by a seventh distance greater than the sixth distance; and
an outer peripheral surface of the outer casing strut root and an outer peripheral surface of the outer casing main body are spaced apart from the rotary shaft of the rotor by an eighth distance greater than the seventh distance.

17. The gas turbine according to claim 16, wherein the inner peripheral surface of the outer casing strut platform overlaps the outer peripheral surface of the outer casing strut platform in the circumferential direction of the rotor.

18. The gas turbine according to claim 1, wherein the inner casing, the outer casing, and the strut are integrally formed.

19. A gas turbine comprising:
a housing;
a rotor rotatably provided in the housing and supported at opposite ends respectively by first and second bearings;
a compressor configured to compress air introduced into the housing by torque transmitted from the rotor;
a combustor configured to produce combustion gas by mixing fuel with the air compressed in the compressor for ignition;
a turbine configured to rotate the rotor by torque obtained using the combustion gas produced in the combustor;
a first support structure configured to support the first bearing with respect to the housing; and
a second support structure configured to support the second bearing with respect to the housing, the second support structure comprising an inner casing accommodating the second bearing, an outer casing fastened to the housing, and a strut extending between the inner casing and the outer casing,
wherein at least one of the inner casing and the outer casing comprises a strut root connected to the strut, a strut platform surrounding the strut root, and a main body surrounding the strut platform, the strut root extending from the strut along a longitudinal axis of the strut and protruding from a peripheral surface of the strut platform,
wherein the strut platform has a thickness smaller than the strut root and the main body to enable expansion and contraction of the strut, and
wherein the peripheral surface of the strut platform includes a substantially flat surface that faces radially away from the strut and extends from the main body to the strut root in a circumferential direction of the rotor.

20. A gas turbine comprising:
a housing;
a rotor rotated by a fluid flowing through the housing;
a bearing rotatably supporting the rotor; and
a support structure configured to support the bearing with respect to the housing, the support structure comprising an inner casing accommodating the bearing, an outer casing fastened to the housing, and a strut extending between the inner casing and the outer casing,
wherein at least one of the inner casing and the outer casing comprises a strut root connected to the strut, a strut platform surrounding the strut root, and a main body surrounding the strut platform, the strut root extending from the strut along a longitudinal axis of the strut and protruding from a peripheral surface of the strut platform, the strut platform having a thickness imparting the support structure with a different natural frequency from the rotor, and
wherein the peripheral surface of the strut platform includes a substantially flat surface that faces radially away from the strut and extends from the main body to the strut root in a circumferential direction of the rotor.

* * * * *